(12) United States Patent
Gier et al.

(10) Patent No.: US 12,730,309 B2
(45) Date of Patent: Sep. 8, 2026

(54) PROJECTION ARRANGEMENT WITH TWO DISPLAY REGIONS ON A COMPOSITE PANE

(71) Applicant: SAINT-GOBAIN SEKURIT FRANCE, Thourotte (FR)

(72) Inventors: Stephan Gier, Herzogenrath (DE); Valentin Schulz, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 236 days.

(21) Appl. No.: 18/719,239

(22) PCT Filed: Dec. 7, 2022

(86) PCT No.: PCT/EP2022/084774
§ 371 (c)(1),
(2) Date: Jun. 12, 2024

(87) PCT Pub. No.: WO2023/138830
PCT Pub. Date: Jul. 27, 2023

(65) Prior Publication Data
US 2025/0060586 A1 Feb. 20, 2025

(51) Int. Cl.
*G02B 27/01* (2006.01)
*B60K 35/23* (2024.01)
*B60K 35/60* (2024.01)

(52) U.S. Cl.
CPC .......... *G02B 27/0101* (2013.01); *B60K 35/23* (2024.01); *B60K 35/60* (2024.01); *G02B 2027/011* (2013.01); *G02B 2027/0196* (2013.01)

(58) Field of Classification Search
CPC .......... G02B 27/0101; G02B 2027/011; G02B 2027/0196; B60K 35/23; B60K 35/60
(Continued)

(56) References Cited

U.S. PATENT DOCUMENTS

2005/0233136 A1 10/2005 Offermann et al.
2009/0295681 A1 12/2009 Kaminski et al.
(Continued)

FOREIGN PATENT DOCUMENTS

DE 102009020824 A1 4/2010
DE 102014220189 A1 4/2016
(Continued)

OTHER PUBLICATIONS

International Search Report issued for International Patent Application No. PCT/EP2022/084774, filed on Dec. 7, 2022 on behalf of Saint-Gobain Glass France. Mail Date: Mar. 7, 2023. 6 pages. (English Translation and DE Original).

*Primary Examiner* — William Choi
(74) *Attorney, Agent, or Firm* — Steinfl + Bruno LLP

(57) ABSTRACT

A projection arrangement with a composite pane having an outer pane and an inner pane, which are connected to one another via a thermoplastic intermediate layer. The composite pain has an opaque masking region and a transparent see-through region. The project arrangement also has at least one imaging unit, which is directed at a head-up display (HUD) region arranged in the see-through region and at a secondary display region arranged in the opaque masking region. The composite pane is equipped in the HUD region and in the secondary display region in each case with a reflection layer, which are suitable for reflecting the radiation of the at least one imaging unit to generate a display image. The reflection layer in the secondary display region has a higher reflectance with respect to the radiation of the at least one imaging unit than the reflection layer in the HUD region.

18 Claims, 3 Drawing Sheets

Figure 1:
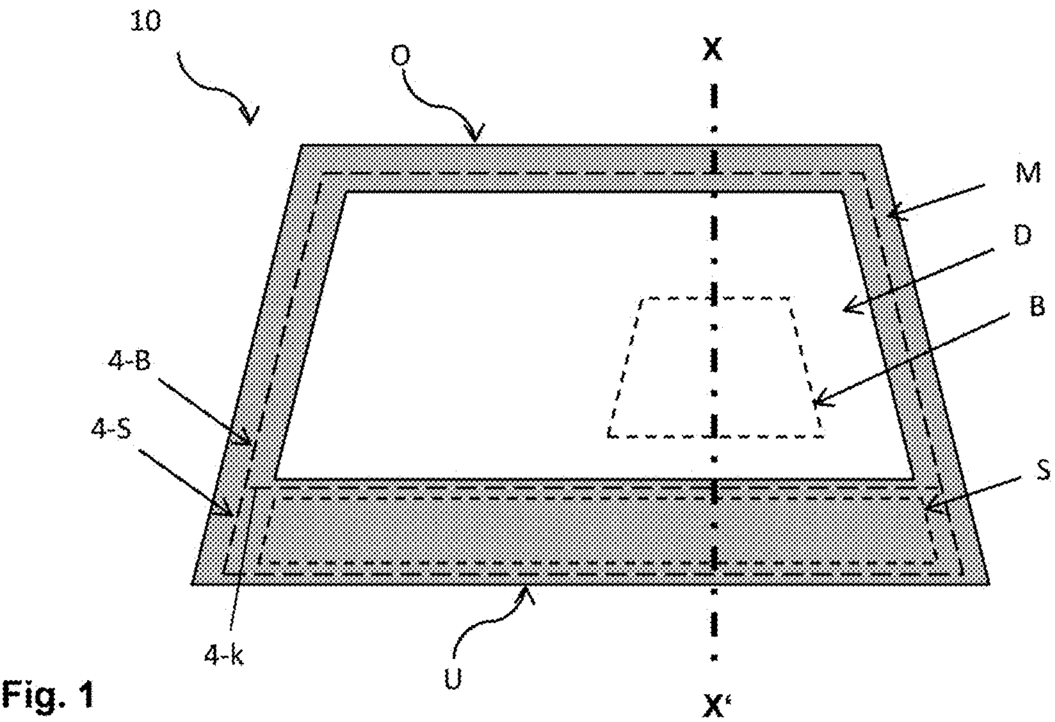

(58) Field of Classification Search
USPC .......................................... 359/630; 345/7, 9
See application file for complete search history.

(56) References Cited

U.S. PATENT DOCUMENTS

| | | | | |
|---|---|---|---|---|
| 2017/0242247 | A1 | 8/2017 | Tso et al. | |
| 2022/0413287 | A1 | 12/2022 | Kusafuka et al. | |
| 2024/0278539 | A1* | 8/2024 | Bronstein | ......... B32B 17/10036 |

FOREIGN PATENT DOCUMENTS

| | | | |
|---|---|---|---|
| WO | 03099553 | A1 | 12/2003 |
| WO | 2019046157 | A1 | 3/2019 |
| WO | 2021106690 | A1 | 6/2021 |
| WO | 2021213884 | A1 | 10/2021 |

* cited by examiner

PROJECTION ARRANGEMENT WITH TWO DISPLAY REGIONS ON A COMPOSITE PANE

CROSS-REFERENCE TO RELATED APPLICATIONS

The present application is the U.S. National Stage of International Patent Application No. PCT/EP2022/084774 filed on Dec. 7, 2022, which, in turn, claims priority to European Patent Application No. 22152971.2 filed Jan. 24, 2022.

The invention relates to a projection arrangement, a method for its production, and its use.

Modern automobiles are increasingly equipped with so-called head-up displays (HUD's). With a projector, typically in the region of the dashboard, images are projected onto the see-through region of the windshield, reflected there, and perceived by the driver as a virtual image behind the windshield (as seen by the driver). Thus, important information can be projected into the field of vision of the driver—for example, the current travel speed, navigation messages, or warnings that the driver can perceive without having to turn his gaze away from the road. Head-up displays can accordingly contribute substantially to increasing traffic safety.

It is also known to equip the windshield with a reflection layer that, while enabling visibility, still reflects the projector radiation to a significant extent. The angle of incidence of the projector radiation on the windshield is typically about 65°, which is close to the Brewster angle for an air-glass transition (56.5° for soda-lime glass). If the projector is operated with s-polarised radiation, this is reflected on the external surfaces of the windshield. In this case, an additional reflection layer can be used to increase the intensity of the display image. If the projector is operated with p-polarised radiation, this is not significantly reflected by the pane surfaces. In this case, a reflection layer is absolutely necessary to realise the HUD. For example, a coating with at least one metallic layer—in particular, a silver layer—can be used as the reflection layer. The windshield typically consists of an outer pane and an inner pane, which are connected to one another by a thermoplastic intermediate layer. Said coating can, for example, be applied to the surface of the outer pane or the inner pane facing the intermediate layer or to a PET carrier film that is embedded in the intermediate layer. HUD's with p-polarised radiation with reflection layers are known, for example, from DE102014220189A1, WO2019046157A1, and U.S.2017242247A1. However, purely dielectric reflection films are also known, which are formed from a plurality of individual layers with alternating high and low refractive indices, wherein the reflective effect is generated by optical interference. Such films can also be embedded in the intermediate layer. A composite pane with such a functional film is known, for example, from WO03099553A1.

Apart from the transparent see-through region, windshields have an opaque masking region, through which it is not possible to see. The masking region is typically arranged in a circumferential edge region of the windshield and surrounds the see-through region. The opaque masking region serves primarily to protect the adhesive used for bonding the windshield to the vehicle body from UV radiation. If the composite pane is equipped with electrical functions (for example, a heating function), the electrical connections required for this can also be concealed in the masking region. The masking region is typically formed by a black cover imprintment on the surface of the outer pane facing the intermediate layer.

It is possible to produce a display also in the masking region basically according to the same principle as an HUD. Thus, the masking region is also irradiated by a projector and reflected there, thereby generating a display for the driver. Thus, for example, information which has been previously displayed in the region of the dashboard, such as the time, travel speed, engine speed, or information of a navigation system, or also the image of a rearward-directed camera, which replaces the conventional exterior mirrors or rearview mirrors, can be displayed directly on the windshield in a practical and aesthetically appealing manner—for example, in the section of the masking region which borders the lower edge of the windshield. A projection arrangement of this type is known, for example, from DE102009020824A1.

If a reflection layer is used for an HUD, a compromise must be found with regard to its optical properties. It is advantageous for the intensity of the display image if the reflectance in the visible spectral range is as high as possible. However, since the reflection layer also reflects light passing through the windshield from the outside, thereby reducing the light transmission of the see-through region, there are limits to the amount of reflectance. If such a reflection layer is also used in the masking region, where light transmission does not play a role, the intensity of the display image is not optimal.

The present invention is based upon the object of providing an improved projection arrangement with a display region in the see-through region and a display region in the masking region. The display in the masking region shall have an improved intensity of the display image.

The object of the present invention is achieved according to the invention by a projection arrangement according to claim 1. Preferred embodiments are apparent from the dependent claims.

The projection arrangement according to the invention comprises a composite pane. The composite pane according to the invention comprises an outer pane and an inner pane, which are connected to one another via a thermoplastic intermediate layer. The composite pane is provided for separating the interior (in particular, the vehicle interior) from the external environment in a window opening (for example, the window opening of a vehicle). In the sense of the invention, inner pane means the pane of the windshield facing the interior. Outer pane means the pane facing the external environment. The composite pane is preferably a vehicle pane—for example, a window pane of a motor vehicle, rail vehicle, ship, or aircraft. The composite pane is particularly preferably the windshield of a vehicle—preferably a motor vehicle—in particular, a car or truck. However, it can also be another vehicle pane, e.g., the rear window or side window, if displays are required on these panes. It can also be used in buildings, e.g., as a window pane, glass façade, or glass door in an exterior or interior region, or even in furniture or other accoutrements.

The windshield has an upper edge and a lower edge, along with two side edges extending between them. Upper edge means the edge intended to point upwards in the installed position. Lower edge means the edge intended to point downwards in the installed position. In the case of vehicle windshields, the upper edge is often referred to as the roof edge, and the lower edge is often referred to as the engine edge.

The outer pane and the inner pane in each case have an outer-side and an interior-side surface and a circumferential side edge extending between them. In the sense of the invention, the outer-side surface means the main surface which is intended to face the external environment when installed. In the sense of the invention, the interior-side surface means the main surface which is intended to face the interior when installed. The interior-side surface of the outer pane and the outer-side surface of the inner pane face one another and are connected to one another by the thermoplastic intermediate layer.

The composite pane according to the invention has an opaque masking region and a transparent see-through region. In the sense of the invention, a masking region refers to a region of the composite pane through which it is not possible to see. The degree of light transmission of the masking region is preferably substantially 0%. In the sense of the invention, a see-through region refers to a region of the composite pane which makes it possible to see through the glass pane and therefore has a certain degree of transparency or at least translucency. The light transmission of the see-through region is preferably at least 10%, particularly preferably at least 20%, and very particularly preferably at least 50%. The light transmission is particularly preferably at least 70%—particularly if the composite pane is used as a windshield of a vehicle for which the total transmission must be greater than 70% (determined by the method for testing the light transmission of motor vehicle panes specified by ECE-R 43, Annex 3, § 9.1).

In a typical embodiment, the masking region surrounds the see-through region in a frame-like manner. The masking region is thus arranged circumferentially around the see-through region. Typically, the masking region forms the edge region of the composite pane, at least in regions in this case. This means that the masking region adjoins at least to a section of the side edge of the composite pane. The masking region often forms the circumferential edge region of the composite pane—in particular, in the case of windshields, roof windows, and rear windows of vehicles. In a preferred embodiment, the masking region is therefore arranged in a circumferential edge region of the windshield and surrounds the see-through region.

In addition to the composite pane, the projection arrangement according to the invention comprises at least one imaging unit. The at least one imaging unit generates a head-up display (HUD) in the see-through region and, in the masking region, a further display region, which is referred to as the secondary display region in the sense of the invention.

The imaging unit can, for example, be a projector or an electronic display, such as an LCD, LED, or TFT display.

As is common with HUD's, the imaging unit irradiates a region of the composite pane (more precisely, its see-through region), where the radiation is reflected towards the observer (driver), thereby generating a virtual image that the observer perceives from behind the composite pane. The region of the see-through region that can be irradiated by the imaging unit is referred to as the HUD region in the sense of the invention. The beam direction of the imaging unit can typically be varied by mirrors—in particular, vertically—in order to adapt the projection to the body size of the observer. The region in which the observer's eyes must be located at a given mirror position is referred to as the eye box window. This eye box window can be displaced vertically by adjusting the mirrors, wherein the entire region accessible as a result (i.e., the superimposition of all possible eye box windows) is referred to as the eye box. An observer located within the eye box can perceive the virtual image. This means, of course, that the observer's eyes must be located within the eye box, and not, for instance, the entire body.

The technical terms used here from the field of HUD's are generally known to the person skilled in the art. For a detailed depiction, reference is made to the dissertation, "Simulation-based measurement technique for testing head-up displays", by Alexander Neumann of the Institute for Informatics of the Technical University of Munich (Munich: University Library of TU Munich, 2012)—in particular, to Chapter 2, "The Head-Up Display".

The at least one imaging unit also irradiates a region of the masking region of the composite pane. This radiation is also reflected in the direction of the observer (driver), generating a further display image that the observer perceives in the masking region. The region of the masking region that can be irradiated by the imaging unit is referred to as the secondary display region in the sense of the invention.

The at least one imaging unit is thus directed at the HUD region arranged in the see-through region and at the secondary display region arranged in the masking region. It irradiates these with radiation in the visible range of the electromagnetic spectrum to generate two display images—specifically, an HUD display image in the see-through region and a secondary display image in the masking region. The radiation is in particular in the spectral range of 450 nm to 650 nm—for example, with the wavelengths 473 nm, 550 nm, and 630 nm (RGB).

Two different imaging units can be used to generate the two display images—specifically, a first imaging unit ("HUD imaging unit", e.g., "HUD projector"), which is directed at and irradiates the HUD region, and a second imaging unit ("secondary imaging unit", e.g., "secondary projector"), which is directed at and irradiates the secondary display region. This means that the display images can be generated independently of one another. The imaging units preferably emit radiation of the same type, i.e., radiation of the same wavelength(s) and the same polarisation. They can differ in their radiation intensity. However, in principle, it is also possible to use a single imaging unit that irradiates both the HUD region and the secondary display region.

The composite pane is equipped with a reflection layer in each case in the HUD region and in the secondary display region. The reflection layers are suitable for reflecting the radiation of the at least one imaging unit to generate the respective display image. According to the invention, the reflection layer in the secondary display region has a higher reflectance with respect to the radiation of the imaging unit than the reflection layer in the HUD region. This means that a single, homogeneous reflection layer is not used to cover both the HUD region and the secondary display region; instead, the reflection layer is adapted to the requirements of the respective display region in each case. A reflection layer with a lower reflectance is used in the HUD region. Since light passing through the composite pane from the outside is also reflected to a lesser extent, high light transmission is ensured in the see-through region, which contains the HUD region. In the masking region, which contains the secondary display region, however, a reflection layer with a higher reflectance is used. This significantly increases the intensity of the secondary display image. The secondary display image is easier for the observer to perceive or, if a separate imaging unit is used for the secondary display, it can be operated with a lower radiation intensity. These are great advantages of the present invention.

The difference between the reflectance of the reflection layer in the secondary display region and the reflectance of the reflection layer in the HUD region with respect to the radiation of the imaging unit is preferably at least 10%—for example, from 30% to 60%. This results in a significantly more intense secondary display image.

The reflection layer in the HUD region preferably has a reflectance of 10% to 50% with respect to the radiation of the imaging unit directed at the HUD region—particularly preferably of 15% to 35%. In this region, the reflectance is high enough for an HUD display with sufficient intensity to be realised. On the other hand, the light transmission of the see-through region is not reduced to a critical degree.

At least the reflection layer in the HUD region is preferably transparent, which in the sense of the invention means that it has an average transmission in the visible spectral range (380 nm to 780 nm) of at least 10%, preferably at least 50%, particularly preferably at least 70%, and very particularly preferably at least 80%, and thereby does not significantly limit the view through the pane.

The reflection layer in the secondary display region preferably has a reflectance of 20% to 100% with respect to the radiation of the imaging unit directed at the secondary display region—particularly preferably of 35% to 70%. This is advantageous for a high intensity and good quality of the secondary display image.

The reflectance describes the proportion of the total irradiated radiation that is reflected. It is indicated in % (based upon 100%-emitted radiation) or as a unitless number from 0 to 1 (normalised to the emitted radiation). It forms the reflection spectrum when plotted as a function of the wavelength. In the context of the present invention, the statements regarding reflectance relate to the reflectance measured at an angle of incidence of 65° to the interior-side surface normal, which corresponds approximately to the irradiation by conventional imaging units. The reflectance values relate to a reflection measurement with a light source which, within the spectral range under consideration, radiates uniformly with a normalised radiation intensity of 100%.

The reflection layers cover at least the respective display region (HUD region or secondary display region). However, they can also extend beyond the respective display region, i.e., also cover adjacent regions of the composite pane. This can be advantageous, so as not to need to position the reflection layers as exactly or to prevent display errors in the edge region of the display image, which could occur as a result of imperfect positioning of the reflection layers. Particularly in the case of the reflection layer in the HUD region, it is advantageous if it covers the entire see-through region. The edge of the reflection layer should preferably be arranged in the masking region, so that the entire see-through region has homogeneous optical properties, and the edge of the reflection layer is not visible.

The reflection layer in the HUD region and the reflection layer in the secondary display region are preferably arranged in the same plane of the composite pane. This has particular advantages in terms of production technology.

In an advantageous embodiment of the invention, the reflection layers are in each case formed as a reflection film or from a reflection film. The reflection films preferably in each case have at least one layer based upon polyethylene terephthalate (PET) and are embedded in the intermediate layer. Such PET-based films are commonly used as functional films for composite panes. They can sometimes be purchased externally and are easy to integrate into the intermediate layer. Since PET-based films have no adhesive properties with respect to the panes, they are typically arranged between at least one outer and at least one inner thermoplastic connecting layer. The at least one outer connecting layer is arranged between the outer pane and the reflection film, and the at least one inner connecting layer is arranged between the inner pane and the reflection film. The intermediate layer therefore has a multi-layer structure, wherein the reflection film is connected to the outer pane via at least one outer thermoplastic connecting layer and to the inner pane via at least one inner thermoplastic connecting layer. The connecting layers are preferably in each case formed from a thermoplastic film (connecting film) or composed of a plurality of film sections. The connecting films are preferably formed on the basis of polyvinyl butyral (PVB), ethylene vinyl acetate (EVA), or polyurethane (PU).

The reflection films have at least one layer based upon or made of PET. The proportion of PET in said layer is preferably more than 90 wt %, and particularly preferably more than 95 wt %. Preferably, said layer consists substantially of PET. In the sense of the present invention, the reflection films can also be referred to as PET-based or PET-containing. The functional films preferably have a thickness of 20 μm to 200 μm, and particularly preferably of 25 μm to 75 μm.

In one embodiment, the reflection films comprise a carrier film based upon or made of PET and an electrically conductive coating applied to it. The electrically conductive coating comprises at least one layer based upon a metal—in particular, silver. The conductive layer preferably contains at least 90 wt % silver, particularly preferably at least 99 wt % silver, and very particularly preferably at least 99.9 wt % silver. The silver layer can have doping—for example, palladium, gold, copper, or aluminium. The thickness of the silver layer is usually between 5 nm and 20 nm. Such a coating has (partially) reflective properties in the visible range so that the reflection film can serve as a reflection surface for the display system. The coating is preferably designed to be transparent, at least in the case of the reflection film for the HUD region. The light transmission of the see-through region is then not reduced to a critical degree by the conductive coating. For transparent coatings, typically only thin metallic layers are used (for example, with a thickness of up to 20 μm) along with dielectric layers, which serve, among other things, for anti-reflection of the metallic layers. In the case of the reflection film for the secondary display region, the coating does not have to be transparent. In this case, a thicker silver layer in the form of a mirror can also be used in principle, so that the reflectance with respect to the radiation of the imaging unit is essentially 100%. Metal-containing coatings typically also have IR-reflective properties. Therefore, they can be used as sun protection coatings in order to reduce the passage of infrared components of solar radiation through the composite pane. This reduces the heating of the interior behind the composite pane, and thus improves thermal comfort.

The electrically conductive coating is preferably a thin-film stack, i.e., a layer sequence of thin, individual layers. The desired reflection characteristics—in particular, the reflectance with respect to the radiation of the imaging unit and the light transmission—are achieved in particular by the choice of materials and thicknesses of the individual layers. The conductive coating can thus be suitably adjusted, which is usual in the technical field and is sufficiently known to the person skilled in the art. The at least one electrically conductive layer primarily provides the reflective effect. By using a plurality of electrically conductive layers, the reflectance can be further increased without reducing the light transmission too much.

Dielectric layers or layer sequences are typically arranged above and below the electrically conductive layer. If the conductive coating comprises a plurality of conductive layers, each conductive layer is preferably arranged in each case between two, typically dielectric, layers or layer sequences, so that a dielectric layer or layer sequence is arranged in each case between adjacent conductive layers. The coating is therefore a thin-film stack with n electrically conductive layers and (n+1) dielectric layers or layer sequences, where n is a natural number, and wherein a conductive layer and a dielectric layer or layer sequence always alternatingly follow a lower dielectric layer or layer sequence. Such coatings are known as sun protection coatings and heatable coatings.

Common dielectric layers of such a thin-film stack are, for example:

- anti-reflection layers that reduce the reflection of visible light and thus increase the transparency of the coated pane, e.g., based upon silicon nitride, silicon-metal mixed nitrides such as silicon zirconium nitride, titanium oxide, aluminium nitride, or tin oxide, with layer thicknesses of, for example, 10 nm to 100 nm;
- adjustment layers, which improve the crystallinity of the electrically conductive layer, e.g., based upon zinc oxide (ZnO), with layer thicknesses of, for example, 3 nm to 20 nm;
- smoothing layers which improve the surface structure for the layers above, e.g., based upon a non-crystalline oxide of tin, silicon, titanium, zirconium, hafnium, zinc, gallium, and/or indium—in particular, based upon tin-zinc mixed oxide (ZnSnO)—with layer thicknesses of, for example, 3 nm to 20 nm.

As already mentioned, in addition to the electrically conductive layer and dielectric layers, the reflection coating can also comprise blocker layers, which protect the electrically conductive layer from degeneration. Blocker layers are typically very thin metal-containing layers based upon niobium, titanium, nickel, chromium, and/or alloys with layer thicknesses of, for example, 0.1 nm to 2 nm.

In a preferred embodiment, the reflection films are purely dielectric polymer films, which contain alternating individual layers with different refractive indices. The films have no metal-containing coatings. They are purely dielectric layer sequences made of polymeric layers having a higher refractive index and polymeric layers having a lower refractive index, which are arranged alternatingly. At least one of the two layer types is formed on the basis of PET. The other layer type can likewise be formed on the basis of PET, wherein the different refractive indices are achieved by means of suitable additives, based upon a PET copolymer or based upon another polymer—for example, PMMA. By the alternation of layers with different refractive indices, optical interference effects are achieved, which can be suitably adjusted for the respective application (in particular by the selection of the layer thicknesses and of the refractive indices) in order to realise reflective properties within a desired spectral range. In this way, reflective properties in the visible spectral range can be achieved in order to use the functional film as a reflection surface for a display system. The reflection properties of the film can be optimised to reflect the radiation of the imaging unit, and a desired reflectance and light transmission can be specifically adjusted. Additional IR-reflecting properties can be achieved in order to reduce the penetration of infrared components of solar radiation.

In principle, a combination of the two embodiments described above is also conceivable, wherein one of the reflection films is designed as a PET carrier film with an electrically conductive coating and the other as a purely dielectric film. For example, a transparent, purely dielectric reflection film can be used for the HUD region, and a carrier film with a silver coating in the form of a mirror can be used for the secondary display region. Or, for example, a purely dielectric reflection film can be used for the secondary display region, and a carrier film with a transparent conductive coating can be used for the see-through region, in order to reduce the passage of IR radiation there.

In a preferred embodiment, the reflection film for the HUD region and the reflection film for the secondary display region are arranged such that their side edges are directly adjacent to one another along a line, which is referred to as a contact line in the sense of the invention. This has the advantage that the reflection films are easier to position, because they do not have to be positioned exactly, independently of one another. In particular, it is possible, prior to the production of the composite pane, to connect the two reflection films along the contact line to form a continuous film, so that only this single continuous film needs to be positioned in the layer stack. The contact line is preferably arranged in the masking region, since it could be distracting in the see-through region. The distance of the contact line from the edge, facing the see-through region, of the masking region is preferably at least 1 mm, and particularly preferably from 3 mm to 15 mm. In this region, the contact line is far enough away from the see-through region that it is well concealed by the masking region and cannot be seen in the see-through region, even taking into account the conventional manufacturing tolerances, and, on the other hand, it is not so far away from the see-through region that the reflection film for the HUD region would take up too large a region of the masking region, which would then no longer be available for the secondary display region.

However, the reflection layer does not necessarily have to be designed as a reflection film. This means that electrically conductive coatings can also be used on one of the surfaces of the panes. The coatings preferably have at least one layer based upon a metal—in particular, silver. They can be designed as transparent, partially reflective layers, wherein only thin metallic layers are used (for example, with a thickness of up to 20 μm), along with dielectric layers, which serve, among other things, for anti-reflection of the metallic layers. For the design of the coating, the above statements regarding conductive coating on a PET-based carrier film apply in principle. However, in principle, a thicker silver layer in the form of a mirror can also be used for the secondary display region. The coatings are preferably arranged on a surface, facing the intermediate layer, of the outer pane or the inner pane, i.e., on the interior-side surface of the outer pane or the outer-side surface of the inner pane. The coating is arranged in particular on the outer-side surface of the inner pane, because it is then easier to realise the masking region by means of an opaque element, which must be farther away from the inner pane than the reflection layer, since the latter would otherwise not be irradiated by the imaging unit. In this case, the thermoplastic intermediate layer can be formed from a single connecting film or from a plurality of connecting films.

The masking region can be formed by an opaque—in particular, black—imprintment (cover imprintment) on the interior-side surface of the outer pane. The cover imprintment typically consists of an enamel, which contains glass frits and colourants (in particular, pigments) and is applied by the screen printing method and subsequently baked on. Such cover imprintments are in general use—particularly for vehicle panes. The pigment is typically a black pigment, such as pigment carbon black, aniline black, bone black, iron oxide black, spinel black, and/or graphite. The cover imprintment preferably has a thickness of 5 μm to 50 μm—particularly preferably of 8 μm to 25 μm.

In a further development of the invention, the masking region is formed, at least in the secondary display region, by an opaque polymer film that is part of the intermediate layer and that is arranged between the reflection layers and the outer pane.

In the sense of the invention, an opaque film is understood to mean a film with a light transmission in the visible spectral range of less than 5%—in particular, of 0%. A transparent film is understood to mean a film with a light transmission of at least 10%, preferably at least 50%, particularly preferably at least 70%, and very particularly preferably at least 80%.

This embodiment is particularly advantageous if the reflection layer is designed as a PET-based reflection film. The outer thermoplastic connecting layer (or at least one of the outer thermoplastic connecting layers, if a plurality are present) has a transparent region and an opaque region. It is composed of two different connecting films—specifically, a transparent connecting film and an opaque connecting film. The opaque connecting film contains colourants (pigments or dyes) in a concentration sufficient for opacity. In particular, the two films are joined flush at their side edges such that they are arranged in one plane and together form one layer. The transparent connecting film forms the transparent region of said outer connecting layer and is arranged (at least partially) in the see-through region of the composite pane. The opaque connecting film forms the opaque region of the outer connecting layer and also at least part of the masking region of the composite pane, which contains the secondary display region. By this is meant that the opaque connecting film of said outer connecting layer is the opaque element that causes a region of the composite pane (specifically, the masking region or at least a part of the masking region containing the secondary display region) to be opaque in turn and does not enable a view through it. The opaque connecting film is thus arranged in the masking region of the composite pane and prevents the view through it (or at least through part of it), so that it becomes an opaque masking region. In other words, said outer connecting layer comprises a transparent see-through region formed of at least one transparent connecting film and an opaque masking region formed of at least one opaque connecting film. The opaque masking region of the outer connecting layer at least partially forms the masking region of the composite pane.

It is possible for the opaque connecting film of said outer connecting layer to form the entire masking region of the composite pane. However, it is also possible that only part of the masking region be formed by the opaque connecting film, while the remaining part of the masking region is formed by another opaque element—in particular, a cover imprintment (preferably on the interior-side surface of the outer pane). The part of the masking region that contains the secondary display region is formed by the opaque connecting film and preferably has no cover imprintment. Other parts of the masking region are formed by an opaque cover imprintment. There, said connecting film is preferably transparent.

One problem with the use of PET-based films is that they have a different shrinkage behavior than typical connecting films, such as PVB films. This can lead to the so-called orange peel effect—distortions that result from deformation at the interface between the reflection film and the adjoining connecting films. The orange peel effect causes optical distortions, which are particularly visible in reflection and therefore reduce the quality of the secondary display image caused by reflection. The inventors have found that the orange peel effect caused by the reflection film is less noticeable against the background of the opaque connecting film than against the background of an opaque cover imprintment. This significantly improves the appearance of the composite pane, because the orange peel effect is less distracting to the observer. The inventors assume that the roughness of the conventional cover imprintments increases the conspicuousness of the orange peel effect, which can be avoided by replacing them with an opaque connecting film.

The outer connecting layer with the opaque connecting film can be the only outer connecting layer. However, there can also be other outer connecting films, which are preferably transparent. There can be a single inner connecting layer or a plurality of inner connecting layers, which is/are transparent. The following layer sequences, which form the composite pane in the specified order, are particularly noteworthy:

- Outer pane—outer connecting layer with opaque region—reflection films—transparent inner connecting layer—inner pane;
- the thickness of the first outer connecting layer is preferably from 0.3 mm to 2 mm, particularly preferably from 0.6 mm to 1.6 mm, and particularly preferably from 0.7 mm to 1.0 mm. The thickness of the inner connecting layer is preferably from 0.005 mm to 0.55 mm, particularly preferably from 0.03 mm to 0.5 mm, and very particularly preferably from 0.035 mm to 0.4 mm;
- Outer pane—outer connecting layer with opaque region—transparent additional outer connecting layer—reflection films—transparent inner connecting layer—inner pane;
- this embodiment has particular advantages in terms of production: the further outer connecting layer, the reflection films, and the inner connecting layer, which are in each case formed in one piece, can be connected to form an easy-to-handle, multi-layer film, which is inserted between the panes during the production of the composite pane, as a result of which the three layers are positioned simultaneously; the thicknesses of the outer connecting layer with opaque region, the further outer connecting layer, and the inner connecting layer are in each case preferably from 0.005 mm to 0.55 mm, particularly preferably from 0.03 mm to 0.5 mm, and very particularly preferably from 0.035 mm to 0.4 mm.

The specified layer sequences contain the specified layers. Further connecting layers—in particular, transparent connecting layers—can be present between the reflection films and the outer pane, and/or between the reflection films and the inner pane. Preferably, the specified layer sequences consist only of the specified layers.

In an advantageous embodiment, the thickness of the outer thermoplastic connecting layer (or the sum of the thicknesses of all outer thermoplastic connecting layers, if a plurality are present) is greater than the thickness of the inner thermoplastic connecting layer (or the sum of the thicknesses of all inner thermoplastic connecting layers, if a plurality are present). This has the advantage of further improving the reflective optics of the composite pane and thus its appearance. Due to the thin inner thermoplastic layer, the PET-based functional film is bonded very firmly to the inner pane, as a result of which it can shrink less, resulting in a less pronounced orange peel effect. Since the composite pane is irradiated by the imaging unit via the inner pane, it is also advantageous for the quality of the display image if the inner thermoplastic layer is thin. The inner thermoplastic connecting layer or connecting layer sequence preferably has a thickness of 0.005 mm to 0.55 mm, particularly preferably of 0.03 mm to 0.5 mm, and very particularly preferably of 0.035 mm to 0.4 mm. The outer thermoplastic connecting layer or connecting layer sequence preferably has a thickness of 0.3 mm to 2 mm, particularly preferably of 0.6 mm to 1.6 mm, and most preferably of 0.7 mm to 1.0 mm. Due to the thicker outer thermoplastic layer or layer sequence, the stability of the composite pane and the shielding from distracting noises are improved.

If the masking region is arranged in a circumferential edge region of the composite pane, one region of the masking region is adjacent to the lower edge of the composite pane, a further region is adjacent to the upper edge of the composite pane, and two further regions are in each case adjacent to a side edge. In an advantageous embodiment, the secondary display region is arranged in the region of the masking region adjoining the lower edge. The display region is thus arranged between the see-through region and the lower edge of the windshield. In the secondary display region, status information can be shown that was previously typically displayed in the region of the dashboard, such as the time of day, driving speed, engine speed, cooling water temperature, internal or external temperature, information from the entertainment system (such as the currently used radio station), or information from a navigation system. Likewise, the picture from one or more rear-facing cameras can be displayed in order to supplement or replace the conventional exterior mirrors or rearview mirrors. The display of such information in the secondary display region has the advantage that the driver does not have to turn his gaze out of the actual field of view as far as is the case with conventional displays. In addition, the display is aesthetically pleasing.

The at least one imaging unit irradiates the reflection layers via the inner pane with electromagnetic radiation in the visible spectral range in order to generate a display image, which a user located in the interior can perceive. The at least one imaging unit is therefore arranged on the inside of the composite pane and irradiates the composite pane via the interior-side surface of the inner pane. The radiation of the imaging unit is (partially) reflected by the reflection layers. Preferably, the projection arrangement has two imaging units, wherein the first imaging unit irradiates the HUD region, and the second imaging unit irradiates the secondary display region.

In a particularly advantageous embodiment, the at least one imaging unit (or both imaging units, if two imaging units are used) emits p-polarised radiation. Thus, the radiation of the at least one imaging unit has a p-polarised component. The p-polarised radiation component is preferably more than 50%, particularly preferably more than 70%, and very particularly preferably more than 90% of the radiation of the imaging unit. In a particularly advantageous embodiment, the radiation of the imaging unit is substantially purely p-polarised—the p-polarised radiation portion is therefore 100% or deviates only insignificantly therefrom. The indication of the polarisation direction refers to the plane of incidence of the radiation on the composite pane. P-polarised radiation refers to a radiation the electric field of which oscillates in the plane of incidence. S-polarised radiation refers to a radiation the electric field of which oscillates perpendicular to the plane of incidence. The plane of incidence is spanned by the incident vector and the surface normal of the composite pane in the geometric centre of the irradiated region. The polarisation, i.e., in particular, the proportion of p- and s-polarised radiation, is determined at a point of the HUD region—preferably at the geometric centre of the HUD region. If the composite pane is curved, which is usually the case with vehicle panes in particular, this has an effect on the plane of incidence of the radiation of the imaging unit. For this reason, polarisation components slightly deviating therefrom can occur in the other regions, which is unavoidable for physical reasons.

The radiation of the imaging unit preferably strikes the composite pane at an angle of incidence of 45° to 70°—in particular, 60° to 70°. In an advantageous embodiment, the angle of incidence deviates by at most 10° from the Brewster angle. The p-polarised radiation is then reflected only insignificantly at the surfaces of the composite pane. As a result, the functional film is the only significant reflection surface for the radiation of the imaging unit. If the radiation were also to be significantly reflected at the external surfaces of the composite pane (air-glass transition), multiple images would be created, which would be at least distracting for the user, if not entirely unacceptable. The angle of incidence is the angle between the vector of incidence of the radiation of the imaging unit and the interior-side surface normal (i.e., the surface normal to the interior-side external surface of the composite pane) in the geometric centre of the HUD region. The Brewster angle for an air-glass transition in the case of soda-lime glass, which is commonly used for window panes, is 56.5° (with a refractive index of soda-lime glass at 550 nm of 1.51). Ideally, the angle of incidence should be as close as possible to this Brewster angle. However, angles of incidence of 65°, for example, can also be used, which are common for HUD projection arrangements, are easy to implement in vehicles, and deviate only slightly from the Brewster angle, so that the reflection of the p-polarised radiation increases only insignificantly.

Since the reflection of the p-polarised radiation of the imaging unit substantially occurs at the reflection layers and not at the external pane surfaces, it is not necessary to arrange the external pane surfaces at an angle (wedge angle) to one another in order to avoid ghost images. Such wedge angles are common in projection arrangements with s-polarised radiation, which is reflected at both external pane surfaces, which would lead to two offset display images (main image and ghost image) if they were arranged in parallel. Therefore, the external surfaces of the windshield are preferably arranged substantially parallel to one another. The thermoplastic intermediate layer is preferably not designed in a wedge shape, but has an substantially constant thickness—in particular, also in the vertical course between the upper edge and the lower edge of the windshield—just like the inner pane and the outer pane. A wedge-shaped intermediate layer, on the other hand, would have a variable—in particular, increasing—thickness in the vertical course between the lower edge and the upper edge of the windshield. The intermediate layer is typically formed from at least one thermoplastic film. Since standard films are significantly cheaper than wedge films, the production of the windshield is more cost-effective.

With the exception of any (PET-based) reflection films, the thermoplastic intermediate layer is preferably formed on the basis of polyvinyl butyral (PVB), ethylene vinyl acetate (EVA), or polyurethane (PU) or from mixtures or copolymers or derivatives thereof—particularly preferably based upon PVB. The intermediate layer is typically formed from at least one thermoplastic film (connecting film)—in particular, based upon PVB, EVA, or PU. This means that the film consists largely of the said polymer (proportion greater than 50 wt %). Apart from the polymer, the film can contain further additives—in particular, plasticisers. If the reflection layers are designed as reflection films, the intermediate layer comprises, in addition to such reflection films, at least two connecting layers (inner and outer connecting layers), wherein each of the connecting layers is typically formed from at least one connecting film—in particular based upon PVB, EVA, or PU. The thickness of each connecting film is preferably from 0.2 mm to 1 mm. For example, PVB films with standard thicknesses of 0.38 mm or 0.76 mm can be used. Instead of films, polymeric coatings can also be used—particularly if the thermoplastic layer in question is to be formed very thin—for example, with a thickness from 0.005 mm to 0.1 mm or from 0.02 mm to 0.07 mm. The outer pane and the inner pane are preferably glass panes—particularly preferably made of soda-lime glass—as is customary for window panes. However, one or both of the panes can also be manufactured from other types of glass, e.g., quartz glass, borosilicate glass, or aluminosilicate glass, or from rigid clear plastics—for example, polycarbonate or polymethyl methacrylate. The panes can be clear or also tinted or coloured. The thicknesses of the outer pane and the inner pane are, independently of one another, preferably from 0.5 mm to 5 mm—particularly preferably from 1 mm to 3 mm.

The outer pane, the inner pane, and the thermoplastic intermediate layer can be clear and colourless, but also tinted or coloured. In a preferred embodiment, the total transmission through the composite pane is greater than 70%—particularly in the event that the composite pane is a windshield. The term total transmittance relates to the method defined by ECE-R 43, Annex 3, § 9.1 for testing the light transmittance of motor vehicle panes. Independently of each other the outer pane and the inner panes can be not prestressed, partially prestressed, or prestressed. If at least one of the panes is to be prestressed, this can be thermal or chemical prestressing.

The windshield is preferably curved in one or more spatial directions, as is common in particular for motor vehicle panes. Typical radii of curvature are in the range of about 10 cm to about 40 m. The interior-side surface of the inner pane is generally concavely curved, and the outer-side surface of the outer pane is generally convexly curved. However, the composite pane can also be flat—for example, if it is provided as a pane for buses, trains or tractors, for buildings, or furniture.

The invention further comprises a method for producing a projection arrangement according to the invention, at least comprising:

(a) connecting an outer pane and an inner pane via a thermoplastic intermediate layer to form a composite pane, wherein the composite pane is provided with an opaque masking region and a transparent see-through region, and wherein the composite pane, in an HUD region arranged in the see-through region and in a secondary display region arranged in the masking region, is equipped in each case with a reflection layer; and (b) directing at least one imaging unit at the HUD region and the secondary display region.

According to the invention, the reflection layers are suitable for reflecting the radiation of the at least one imaging unit to generate a display image, wherein the reflection layer in the HUD region has a higher reflectance with respect to the radiation of the at least one imaging unit than the reflection layer in the secondary display region.

The above embodiments and preferred embodiments in connection with the projection arrangement apply equally to the method.

The reflection layers can be applied to the composite pane in different ways. If the reflection layers are coatings on the outer or inner pane, these are preferably applied to the respective pane surface by physical vapour deposition (PVD)—particularly preferably by cathode sputtering ("sputtering"), and very particularly preferably by magnetic-field-assisted cathode sputtering ("magnetron sputtering"). In principle, however, the coating can also be applied, for example, by means of chemical vapour deposition (CVD), e.g., plasma-enhanced chemical vapour deposition (PECVD), by vapour deposition, or by atomic layer deposition (ALD). The reflection layers are preferably applied to a surface that then faces the intermediate layer (interior-side surface of the outer pane or outer-side surface of the inner pane—preferably the latter) prior to the connection of the panes to form the composite pane (lamination). In this case, the intermediate layer can be formed from a single connecting film or from a plurality of connecting films stacked on top of one another. Thus, a layer stack is created from the following elements in the specified order: outer pane—at least one connecting film—inner pane. This layer stack is then laminated to form a composite pane.

In a preferred embodiment, however, the reflection layers are designed as reflection films. These are placed between two thermoplastic connecting layers and together form the intermediate layer. The thermoplastic connecting layers are preferably arranged by positioning a corresponding thermoplastic connecting film at the corresponding location. Alternatively, one or both of the adjoining layers can be provided with a thin polymer coating. The connecting layers are preferably provided in each case in the form of at least one thermoplastic connecting film (in particular, PVB film). A layer stack is therefore created from the following elements in the specified order: outer pane—at least one connecting film—reflection films—at least one connecting film—inner pane. This layer stack is then laminated to form a composite pane. The reflection films can generally be purchased, e.g., as PET carrier film with an electrically conductive coating or as a purely dielectric reflection film with different individual layers, which alternatingly have a higher and a lower refractive index. They can be produced by deposition of an electrically conductive coating on a PET carrier film—in particular, with the aforementioned thin-film coating methods—or by co-extrusion or multi-extrusion of two materials with different refractive indices, in order to form a purely dielectric reflection film.

The reflection film for the HUD region and the reflection film for the secondary display region can already be stably connected to one another before being arranged in the layer stack—in particular, via their side edges along a contact line. This connection can be achieved by bonding or fusing, for example. As a result, both reflection films can be handled as a single film and positioned together in the layer stack.

The masking region can also be formed in different ways. It can be formed by an opaque enamel printing ink being applied to a surface of the panes-—particular, the interior-side surface of the outer pane—in particular, by means of a screen printing method. The enamel printing ink is then baked into the pane surface, wherein it forms an opaque cover imprintment which forms the masking region.

In a preferred embodiment, however, the masking region is formed by an opaque polymer film. In this case, one of the connecting layers is not formed by a single homogeneous connecting film, but is composed of a section of an opaque connecting film and a section of a transparent connecting film. The connecting layer with the opaque connecting film is arranged between the reflection layer and the outer panes. If reflection films are used as reflection layers, the connecting layer with the opaque connecting film is the one (or one of the ones) that is placed between the reflection layers and the outer pane.

In an advantageous embodiment, a transparent connecting layer and the reflection films are initially arranged flat on top of one another and permanently and stably connected to form a multi-layer film (more precisely, a two-layer film, "bilayer")—for example, by gluing or lamination (in particular, under the influence of temperature). The advantage of the multi-layer film is that it can be handled like a single connecting film—the two layers are positioned together in the layer stack in one step and do not have to be arranged individually and congruently, one after the other, in the layer stack. The transparent connecting layer is formed in one piece from a transparent connecting film, so that the multi-layer stack is comparatively easy to produce.

The outer pane, the composite connecting layer with the opaque connecting film, the two-layer film, and the inner pane are subsequently arranged in the specified order on top of one another to form the layer stack, wherein the connecting layer of the multi-layer film faces the inner pane. In principle, however, it is possible to insert additional connecting layers between the two-layer film and the inner pane, and/or between the two-layer film and the outer pane—in particular, transparent connecting layers.

In a particularly advantageous embodiment, a transparent connecting layer, the reflection films, and a further transparent connecting layer are initially arranged on top of one another in the specified order and connected in a permanently stable manner to form a multi-layer film (more precisely, a three-layer film, "trilayer")—for example, by bonding or lamination (in particular, under the influence of temperature). The reflection films are securely embedded in the multi-layer film, and, due to the external connecting layers, it has adhesive properties with respect to the panes and other connecting layers. The advantage of the multi-layer film is that it can be handled like a single connecting film—the three layers are positioned together in the layer stack in one step and do not have to be arranged individually and congruently, one after the other, in the layer stack. The transparent connecting layers are in each case formed in one piece from a transparent connecting film, so that the multi-layer stack is comparatively easy to produce.

The outer pane, the composite connecting layer with the opaque connecting film, the multi-layer film, and the inner pane are subsequently arranged on top of one another in the specified order to form a layer stack. The produced composite pane then consists of the following layers in the specified order: outer pane—outer connecting layer with opaque region—transparent additional outer connecting layer—reflection films—transparent inner connecting layer—inner pane. In principle, however, it is possible to insert further connecting layers between the three-layer film and the inner pane, and/or between the three-layer film and the outer pane—in particular, transparent connecting layers.

Said multi-layer films (two-layer film, three-layer film) are preferably provided in large-area form, e.g., as roll products, with dimensions that are significantly larger than the area of typical composite panes. A suitable piece is then cut out of this during the production of the composite pane, as is also common with simple connecting films.

Once the layer stack has been created from the outer pane, the components of the intermediate layer, and the inner pane, including the masking region and reflection layers, it is laminated to form the composite pane. This is carried out in particular by methods known per se—for example, by means of autoclave methods, vacuum bag methods, vacuum ring methods, calender methods, vacuum laminators, or combinations thereof. The outer pane and inner pane are usually connected via the intermediate layer under the effect of heat, vacuum, and/or pressure.

If the composite pane is to be curved, the outer pane and the inner pane will be preferably subjected to a bending process before lamination, and preferably after possible coating processes, in order to bring them into a cylindrically or spherically curved shape. Preferably, the outer pane and the inner pane are curved together congruently (i.e., simultaneously and by the same tool) because this optimally matches the shape of the panes to one another for the subsequent lamination. Typical temperatures for glass-bending processes are, for example, 500° C. to 700° C. At these temperatures, the glass panes become plastically deformable and can be brought into the desired shape by bending methods known per se—for example, gravity bending, press bending, suction bending, or combinations thereof.

The invention also comprises the use of a projection arrangement according to the invention in a vehicle (in particular, a motor vehicle), wherein the composite pane is a window pane of the vehicle—preferably a windshield. The projection arrangement can also be used in buildings, furniture, or accoutrements.

In the following, the invention is explained in more detail with the aid of a drawing and exemplary embodiments. The drawing is a schematic representation and is not true-to-scale. The drawing does not limit the invention in any way.

Figure 2:
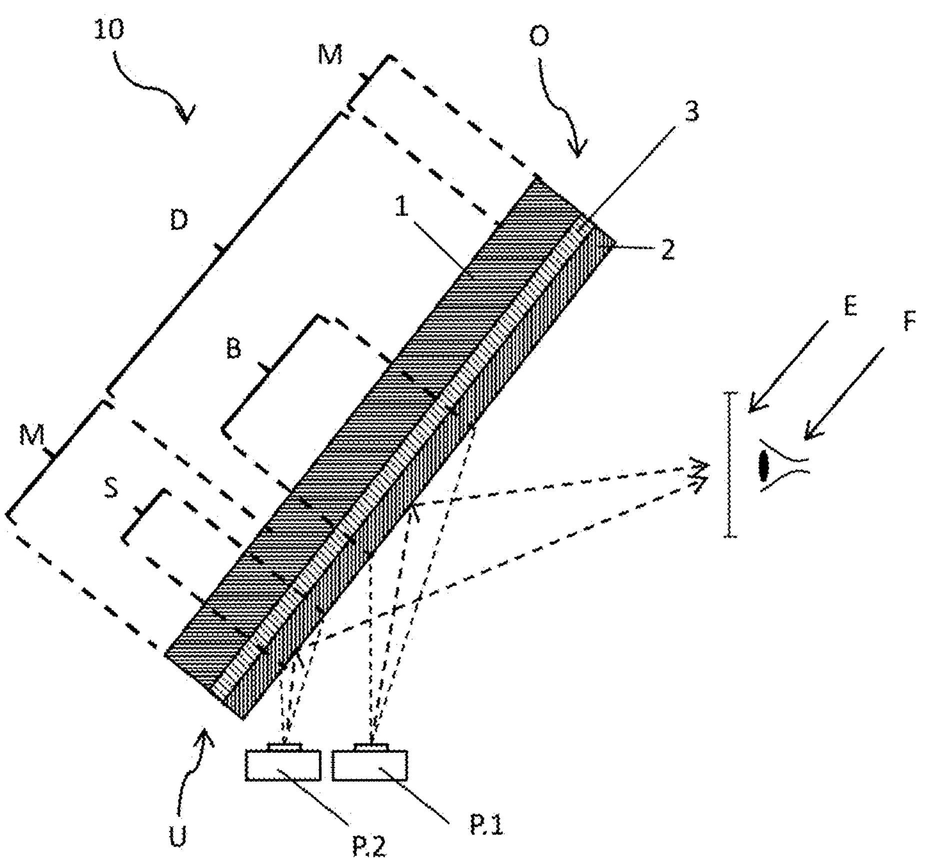
Figure 3:
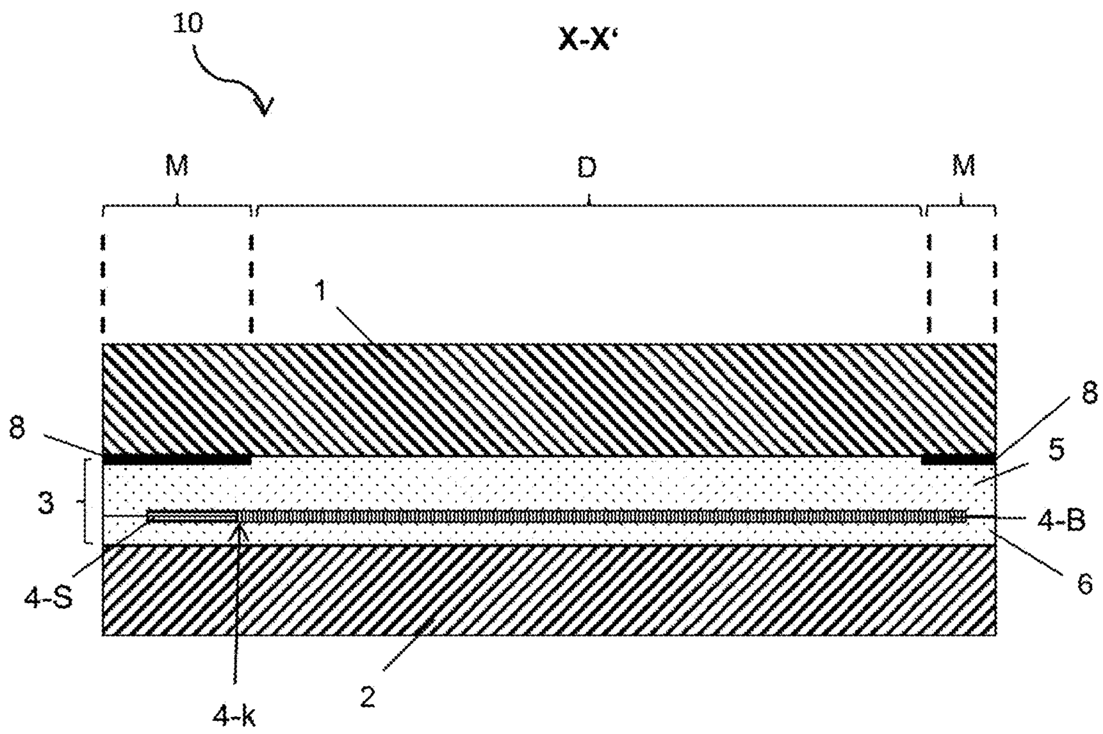
Figure 4:
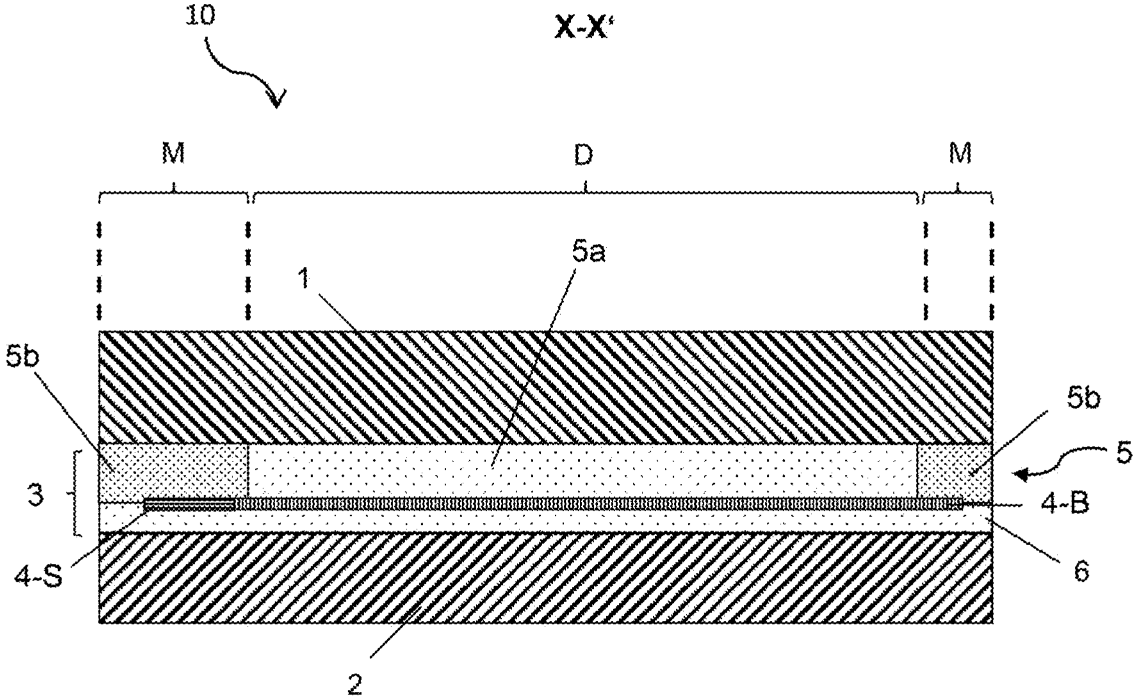
Figure 5:
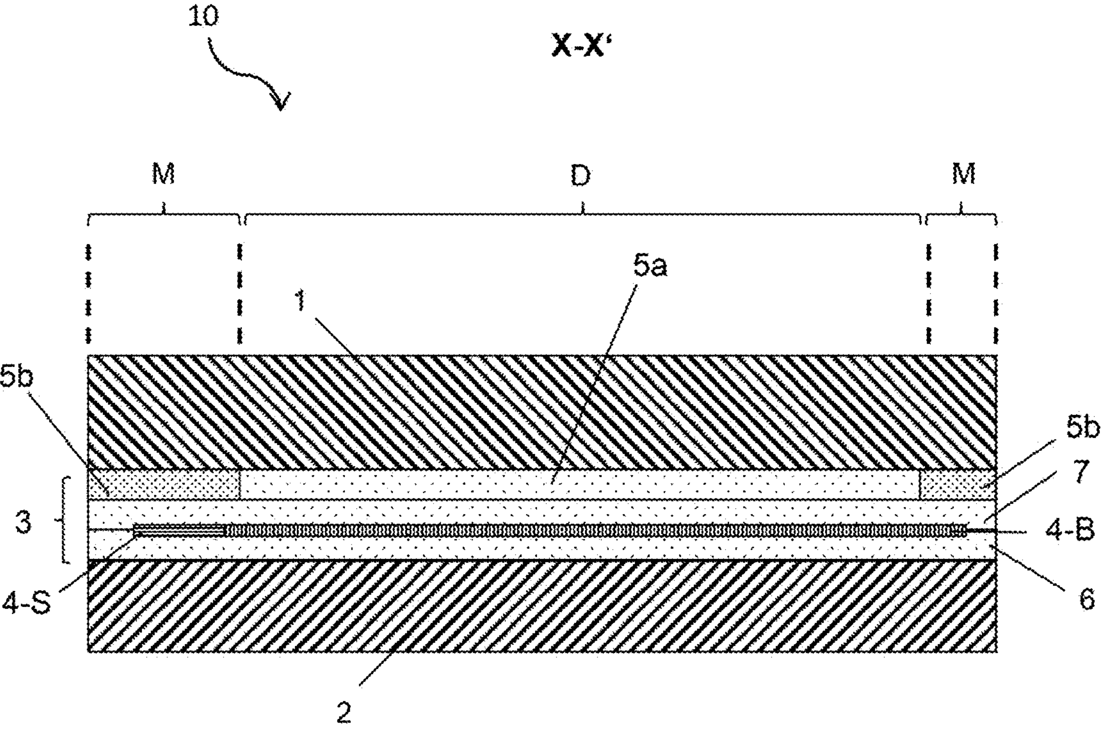

The following are shown:

FIG. 1 a plan view of a composite pane of a projection arrangement according to the invention, FIG. 2 a cross-section through a projection arrangement according to the invention with the composite pane of FIG. 1, FIG. 3 a cross-section through the composite pane of FIG. 1, FIG. 4 a cross-section through a further embodiment of the composite pane of a projection arrangement according to the invention, FIG. 5 a cross-section through a further embodiment of the composite pane of a projection arrangement according to the invention.

FIG. 1, FIG. 2, and FIG. 3 each show a detail of a projection arrangement according to the invention comprising a composite pane 10 and two projectors P.1, P.2. FIG. 1 shows a plan view of the composite pane 10, FIG. 2 shows a cross-section through the projection arrangement along the sectional line X-X' marked in FIG. 1, and FIG. 3 shows a cross-section through the composite pane 10 along the same sectional line with a larger number of details.

The composite pane 10 is the windshield of a motor vehicle and has an opaque masking region M, which is arranged in a circumferential edge region and surrounds a transparent, see-through region D in a frame-like manner. The windshield 10 has an upper edge O pointing upwards (in the direction of the vehicle roof) and a lower edge U pointing downwards (in the direction of the engine compartment) and two side edges extending between them. Such masking regions M are common with vehicle panes; they serve to protect the adhesive used to bond the windshield 10 to the vehicle body from UV radiation. In addition, any electrical connections or the side edge of an embedded functional film can be hidden within the masking region M.

The projection arrangement also comprises two projectors P.1, P.2. The first projector P.1 is aimed at a region of the composite pane 10 in the see-through region D. In this region, which is referred to as HUD region B in the sense of the invention, images can be generated by the projector P.1, which are perceived by an observer F (vehicle driver) as virtual images on the side of the composite pane 10 facing away from him if his eyes are located within the so-called eye box E. The second projector P.2 is aimed at a region of the composite pane 10 in the masking region M. In this region, which is referred to as secondary display region S in the sense of the invention, images can also be generated by the projector P.2, which are perceived by the observer F. In the HUD region B, a head-up display (HUD) is realised, through which the observer F can be shown information in his field of vision without having to take his eyes off the road. In the secondary display region S, which is arranged in a section of the composite pane 10 bordering on the lower edge U, status displays can be shown, for example, which are conventionally displayed on the dashboard (for example, the driving speed, the display of the navigation system, speed limits, and other information regarding the route currently being traveled, temperature, or time information), or the image or images from one or more rear-facing cameras, which supplement or replace the conventional rearview mirrors and/or exterior mirrors.

The composite pane 10 is constructed from an outer pane 1 and an inner pane 2, which are connected to one another via a thermoplastic intermediate layer 3. In the installed position, the outer pane 1 faces the external environment; the inner pane 2 faces the vehicle interior. For the sake of simplicity, the windshield 10 is shown flat, although vehicle panes are usually curved, which is also preferred in the context of the present invention. The outer pane 1 and the inner pane 2 consist of soda-lime glass. The outer pane 1 has, for example, a thickness of 2.1 mm, and the inner pane 2 has a thickness of 1.6 mm.

The masking region M is formed by a black cover imprintment 8 which is applied to the interior-side surface, facing the intermediate layer 3, of the outer pane 1. In the automotive sector, such a cover imprintment 8 is generally standard: an enamel ink is printed onto the pane surface by means of screen printing. It contains a black pigment as well as glass frits which are baked into the pane surface.

The intermediate layer 3 has a multi-layered structure. It has an outer connecting layer 5 which faces the outer pane 1 and an inner connecting layer 6 which faces the inner pane 2. The connecting layers 5, 6 are transparent and made of commercially available PVB films, which also contain plasticisers. The outer connecting layer 5 has, for example, a thickness of 0.76 mm, and the inner connecting layer 6 has a thickness of 0.38 mm.

Two reflection layers 4-B, 4-S, which are designed as reflection films, are arranged between the connecting layers 5, 6. The reflection layers 4-B, 4-S are thus connected to the outer pane 1 via the outer connecting layer 5 and to the inner pane 2 via the inner connecting layer 6. The reflection layer 4-B extends over the entire see-through region D; its side edges are arranged in the masking region M. The reflection layer 4-B is present in the HUD region B. The reflection layer 4 is arranged in the section, adjoining the lower edge U, of the masking region M. The reflection layer 4-S is present in the secondary display region S. The reflection layers 4-B, 4-S are arranged in the same plane of the composite pane 10—specifically, between the connecting layers 5, 6. They are arranged adjacent to one another, wherein sections of their side edges are in direct contact with one another along a contact line 4-*k*. The contact line 4-*k* is arranged in the section, adjoining the lower edge U, of the masking region M and is at a distance from the edge, facing the see-through region D, of the masking region M of, for example, 7 mm.

The projectors P.1, P.2 are arranged on the inside of the composite pane 10. Thus, the inner pane 2 of the composite pane 10 faces the projectors P.1, P.2. The projector P.1 irradiates the HUD region B, and the projector P.2 irradiates the secondary display region S, in each case to generate a display image. The radiation of the projectors P.1, P.2 is p-polarised—in particular, substantially purely p-polarised. Since the projectors P.1, P.2 irradiate the composite pane 10 with an angle of incidence of about 65°, which is close to the Brewster angle, the radiation from the projectors P.1, P.2 is reflected only insignificantly at the external surfaces, facing away from the intermediate layer 3, of the composite pane 10. The double reflection at these external surfaces leads to a ghost image in s-polarised HUD's, which is usually made to coincide with the main image by arranging the surfaces at a wedge angle to one another (by using a wedge-shaped intermediate layer and/or at least one wedge-shaped pane). This can be dispensed with in projection arrangements with p-polarised radiation. For this purpose, the composite pane 10 must be equipped with an additional reflective interface in order to reflect the p-polarised radiation. In this case, the reflection layer 4-B fulfills this function for the HUD region B, and the reflection layer 4-S fulfills this function for the secondary display region S.

The reflection layers 4-B, 4-S are, for example, purely dielectric reflection films, which are in each case constructed from a sequence of individual, polymeric dielectric layers, wherein the individual layers alternatingly have a higher and a lower refractive index. At least one of the two layer types is made of PET. As a result of interference, the reflection films have reflective properties—in particular, with respect to the radiation of the projectors P.1, P.2.

By using different reflection layers 4-B, 4-S for the HUD region B and the secondary display region S, according to the invention, their properties can be specifically adjusted to the respective requirements. In this case, this is achieved in particular by the refractive index and/or thickness of the individual layers, as a result of which the optical interference can be influenced. In the HUD region B, a reflection layer 4-B with a lower reflectance compared to the projector radiation is used than in the secondary display region S. As a result, it is ensured that the light transmission of the see-through region D is not reduced to a critical degree. The reflection layer 4-S in the secondary display region S has a higher reflectance, which is possible without any problems, since the light transmission in the masking region M does not play a role. This can significantly increase the intensity of the secondary display image. This is the major advantage of the present invention.

Even though the invention is exemplified here with projectors P.1, P.2 as imaging units, electronic displays (screens, "displays"), for example, can alternatively be used as imaging units. This can be particularly advantageous in the case of the second imaging unit P.2 for the secondary display region S.

FIG. 4 shows a cross-section of a further composite pane 10 that can be used for a projection arrangement according to the invention. The outer pane 1, the inner pane 2, the inner connecting layer 6, and the reflection layers 4-B, 4-S are designed in exactly the same way as in the example in FIGS. 1 to 3. However, the outer pane 1 is not provided with a cover imprintment 8. Instead, the masking region M is formed by an opaque film 5*b*. The outer connecting layer 5 is composed of this opaque film 5*b* in the masking region M and a transparent film 5*a* in the see-through region D. Both films 5*a* and 5*b* are 0.76 mm-thick PVB films, wherein the opacity of film 5*b* is realised by the addition of pigments.

The PET-based reflection layers 4-B, 4-S can cause a so-called orange peel effect, which is particularly visible in reflection and leads to optical distortions. The inventors have found that the orange peel effect is much less noticeable against the background of the opaque film 5*b* than against the background of the cover imprintment 8. Optical distortions are less distracting, which can be seen with the naked eye and can be used for a qualitative comparison (for example, with a lamp reflected on the composite pane).

FIG. 5 shows a cross-section of a further composite pane 10 that can be used for a projection arrangement according to the invention. The outer pane 1, the inner pane 2, the inner connecting layer 6, and the reflection layers 4-B, 4-S are designed in exactly the same way as in the examples in FIGS. 1 to 3 and FIG. 4. As in FIG. 4, the masking region is formed by an opaque film 5*b*, and the outer pane 1 is not provided with a cover imprintment 8. In addition to the outer connecting layer 5, which is composed of the opaque film 5*b* and a transparent film 5*a*, there is a further outer connecting layer 7, which is formed from a transparent PVB film. The reflection layers 4-B, 4-S are arranged between the transparent inner connecting layer 6 and the transparent further outer connecting layer 7, and the outer connecting layer 5 with the opaque film 5*b* between the further outer connecting layer 7 and the outer pane 1. The two outer connecting layers 5, 7 in each case have a thickness of 0.38 mm.

This structure has the advantage that the further outer connecting layer 7, the reflection layers 4-B, 4-S, and the inner connecting layer 6 can already be connected to form a pre-laminated, multi-layer film prior to the production of the composite pane, which is then easier to handle than if each individual layer has to be arranged in the layer stack between the panes 1, 2. On the other hand, a multi-layer film involving the multi-piece outer connecting layer 5 would be more complicated to produce.

LIST OF REFERENCE SIGNS (10) Composite pane
(1) Outer pane
(2) Inner pane
(3) Thermoplastic intermediate layer
(4-B) Reflection layer in the HUD region B
(4-S) Reflection layer in the secondary display region S
(4-*k*) Boundary line of the reflection layers 4-B, 4-S
(5) Outer connecting layer of the intermediate layer 3
(5*a*) Transparent film of the outer connecting layer 5
(5*b*) Opaque film of the outer connecting layer 5
(6) Inner connecting layer
(7) Further outer connecting layer
(8) Cover imprintment
(P.1) First imaging unit/first projector
(P.2) Second imaging unit/second projector
(E) Eye box
(F) Observer/vehicle driver
(M) Masking region of the composite pane 10
(D) See-through region of the composite pane 10
(B) HUD region of the composite pane 10
(S) Secondary display region of the composite pane 10
(O) Upper edge of the composite pane 10
(U) Lower edge of the composite pane 10

The invention claimed is:

1. A projection arrangement, comprising:
a composite pane comprising:
(a) an outer pane,
(b) an inner pane,
(c) a thermoplastic intermediate layer through which the outer pane is connected to the inner pane,
(d) a transparent see-through region having a head-up display (HUD) region with a first reflection layer,
(e) an opaque masking region having a secondary display region with a second reflection layer; and
at least one imaging unit directed at the HUD region and the secondary display region;
wherein:
the first reflection layer and the second reflection layer reflect radiation of the at least one imaging unit to generate a display image; and
the second reflection layer has a higher reflectance with respect to the radiation of the at least one imaging unit than the first reflection layer.

2. The projection arrangement according to claim 1, the at least one imaging unit comprising a first imaging unit directed at the HUD region and a second imaging unit directed at the secondary display region.

3. The projection arrangement according to claim 1, wherein a difference between a reflectance of the second reflection layer with respect to the radiation of the at least one imaging unit and a reflectance of the first reflection layer with respect to the radiation of the at least one imaging unit is at least 10%.

4. The projection arrangement according to claim 3, wherein the difference is from 30% to 60%.

5. The projection arrangement according to claim 1, wherein
the first reflection layer is formed from a first reflection film and the second reflection layer is formed from a second reflection film,
the first reflection film and the second reflection film have at least one layer based upon polyethylene terephthalate (PET), and
the first reflection film and the second reflection film are embedded in the thermoplastic intermediate layer.

6. The projection arrangement according to claim 5, wherein the first reflection film and the second reflection film are purely dielectric polymer films, which contain alternating individual layers with different refractive indices.

7. The projection arrangement according to claim 5, wherein a side edge of the first reflection film is directly adjected to a side edge of the second reflection film along a contact line, the contact line arranged in the opaque masking region.

8. The projection arrangement according to claim 7, wherein a distance of the contact line to an edge of the opaque masking region facing the transparent see-through region is at least 1 mm.

9. The projection arrangement according to claim 8, wherein the distance is from 3 mm to 15 mm.

10. The projection arrangement according to claim 1, wherein the opaque masking region is formed at least in the secondary display region by an opaque polymer film that is part of the intermediate layer, the opaque polymer film arranged between the first reflection layer and the outer pane and between the second reflection layer and the outer pane.

11. The projection arrangement according to claim 1, wherein the opaque masking region is arranged in a circumferential edge region of the composite pane and surrounds the transparent see-through region.

12. The projection arrangement according to claim 11, wherein:

the composite pane has an upper edge, a lower edge, a first side edge and a second side edge, the first side edge and the second side edge extending between the upper edge and the lower edge, and the secondary display region is arranged in the opaque masking region, adjoining the lower edge of the composite pane.

13. The projection arrangement according to claim 1, wherein the at least one imaging unit emits p-polarised radiation.

14. The projection arrangement according to claim 1, wherein the thermoplastic intermediate layer is formed with at least one of: polyvinyl butyral (PVB), ethylene-vinyl acetate (EVA), and polyurethane (PU).

15. The projection arrangement according to claim 1, wherein the outer pane and the inner pane are formed from soda-lime glass.

16. A vehicle comprising the projection arrangement according to claim 1, wherein the composite pane is a window pane of the vehicle.

17. The vehicle according to claim 16, wherein the window pane is a windshield.

18. A method for producing a projection arrangement, comprising the steps of:

(a) connecting an outer pane and an inner pane via a thermoplastic intermediate layer to form a composite pane, the composite pane comprising a transparent see-through region having a HUD region with a first reflection layer and an opaque masking region having a secondary display region with a second reflection layer; and (b) directing at least one imaging unit at the HUD region and the secondary display region;

wherein the first reflection layer and the second reflection layer are suitable for reflecting radiation of the at least one imaging unit to generate a display image, and wherein the first reflection layer has a higher reflectance with respect to the radiation of the at least one imaging unit than the second reflection layer.

* * * * *